United States Patent
Lauer

(10) Patent No.: US 10,370,116 B2
(45) Date of Patent: Aug. 6, 2019

(54) WIRELESS CABIN SEATBACK SCREEN LOCATION DETERMINATION

(71) Applicant: GOGO LLC, Chicago, IL (US)

(72) Inventor: Bryan Adrian Lauer, Chicago, IL (US)

(73) Assignee: GOGO LLC, Chicago, IL (US)

( * ) Notice: Subject to any disclaimer, the term of this patent is extended or adjusted under 35 U.S.C. 154(b) by 21 days.

(21) Appl. No.: 15/659,042

(22) Filed: Jul. 25, 2017

(65) Prior Publication Data

US 2019/0031366 A1  Jan. 31, 2019

(51) Int. Cl.
| | | |
|---|---|---|
| B64D 45/00 | (2006.01) | |
| B64D 11/00 | (2006.01) | |
| H04B 5/00 | (2006.01) | |
| H04L 29/08 | (2006.01) | |
| H04W 84/12 | (2009.01) | |

(52) U.S. Cl.
CPC .......... B64D 45/00 (2013.01); B64D 11/0015 (2013.01); H04B 5/0025 (2013.01); H04B 5/0062 (2013.01); H04L 67/12 (2013.01); *B64D 2045/007* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 5,491,830 A | 2/1996 | Ferri | |
| 6,131,119 A | 10/2000 | Fukui | |
| 7,319,854 B2 | 1/2008 | vonDoenhoff et al. | |
| 9,282,530 B1 | 3/2016 | Couleaud et al. | |
| 2008/0023600 A1* | 1/2008 | Perlman | B60K 35/00 248/128 |
| 2014/0242910 A1 | 8/2014 | Umlauft et al. | |
| 2015/0358052 A1 | 12/2015 | Muirhead | |
| 2017/0182957 A1 | 6/2017 | Watson et al. | |

OTHER PUBLICATIONS

Locamatic, https://www.45rpmsoftware.com/locamatic.php, retrieved from the internet on Jul. 10, 2017, 2 pages.

* cited by examiner

*Primary Examiner* — Nay Tun
*Assistant Examiner* — Shawna M Kingston
(74) *Attorney, Agent, or Firm* — Marshall, Gerstein & Borun LLP

(57) ABSTRACT

A passenger unit for use on-board a passenger vehicle (e.g., an in-flight entertainment device) includes a display, a memory storing a passenger unit identifier, a wireless network interface, and a connector configured to physically couple to a connector on a mounting unit, where the mounting unit is installed on, or proximate to, a particular seat of a plurality of seats on-board the passenger vehicle. The passenger unit also includes a controller configured to obtain a seat location code of the particular seat from the mounting unit, and to cause the seat location code and the passenger unit identifier to be transmitted, via the wireless network interface, to a server on-board the passenger vehicle. The server is configured to map the passenger unit to the particular seat using the seat location code and the passenger unit identifier.

8 Claims, 7 Drawing Sheets

WIRELESS CABIN SEATBACK SCREEN LOCATION DETERMINATION

TECHNICAL FIELD

The instant disclosure generally relates to in-vehicle passenger devices (e.g., in-flight entertainment units) and, in particular, to systems and methods that automatically determine the seat locations of such devices.

BACKGROUND

Currently, some airlines provide seatback devices or units that allow passengers to utilize and/or access various services. For example, such devices may include display screens that can be used to watch movies or television programming, browse the Internet, order food and/or drinks, or place "duty free" orders. Moreover, some systems incorporating such devices utilize wireless connectivity. For example, a seatback device may include an IEEE 802.11 (WiFi) interface to enable wireless communication with an onboard server via one or more wireless access points.

Generally, it is advantageous to know the location of the seat with which a given seatback device is associated (e.g., the seat number or other seat identifier). If a passenger uses a particular seatback device to enter a food or drink order, for example, knowledge of the associated seat location may help the cabin attendant deliver the order to the appropriate person. As another example, if a particular seatback device fails, knowledge of the associated seat location may help maintenance personnel to quickly and easily identify the device in need of repair or replacement.

While seatback devices can be manually programmed to indicate their seat location (e.g., to an on-board server), such an approach is subject to human error. Moreover, a manual approach can be time consuming and inefficient (and therefore costly), as it generally must be repeated each time that a seatback device is replaced or switched to another seat.

BRIEF SUMMARY OF THE DISCLOSURE

This summary is provided to introduce, in a simplified form, a selection of concepts that are further described below in the Detailed Description. This summary is not intended to identify key features or essential features of the claimed subject matter, and is not intended to be used to limit the scope of the claimed subject matter.

In one embodiment, a passenger unit for use on-board a passenger vehicle includes a first connector configured to physically couple to a second connector on a mounting unit, the mounting unit being installed on, or proximate to, a particular seat of a plurality of seats on-board the passenger vehicle. The passenger unit also includes a display, a memory storing a passenger unit identifier, a wireless network interface, and a controller. The controller is configured to obtain a seat location code of the particular seat from the mounting unit, and cause the seat location code and the passenger unit identifier to be transmitted, via the wireless network interface, to a server on-board the passenger vehicle. The server is configured to map the passenger unit to the particular seat using the seat location code and the passenger unit identifier.

In another embodiment, a system for identifying seat associations on-board a passenger vehicle having a plurality of seats includes a server associated with a first memory, a mounting unit installed on, or proximate to, a particular seat of the plurality of seats, and a passenger unit. The passenger unit includes a first connector configured to physically couple to a second connector on the mounting unit, a display, a second memory storing a passenger unit identifier, a wireless network interface, and a controller. The controller is configured to obtain a seat location code from the mounting unit, and cause the seat location code and the passenger unit identifier to be transmitted to the server via the wireless network interface and a wireless access point. The server is configured to receive the transmitted seat location code and passenger unit identifier via the wireless access point, generate, using the received seat location code and passenger unit identifier, assignment data linking the passenger unit to the particular seat, and store the assignment data in the first memory.

In another embodiment, a method for identifying seat associations is implemented on-board a passenger vehicle having a plurality of seats. The method includes obtaining, by a passenger unit, a seat location code from a mounting unit installed on, or proximate to, a particular seat of the plurality of seats. The passenger unit is configured to physically couple to the mounting unit. The method also includes retrieving, from a memory of the passenger unit, a passenger unit identifier, transmitting, from the passenger unit to an on-board server via a wireless local area network, the seat location code and the passenger unit identifier, and receiving, at the on-board server via the wireless local area network, the seat location code and the passenger unit identifier. The method also includes generating, at the on-board server and using the seat location code and the passenger unit identifier, assignment data linking the passenger unit to the particular seat, and storing the assignment data in a memory associated with the on-board server.

DETAILED DESCRIPTION OF THE PREFERRED EMBODIMENTS

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
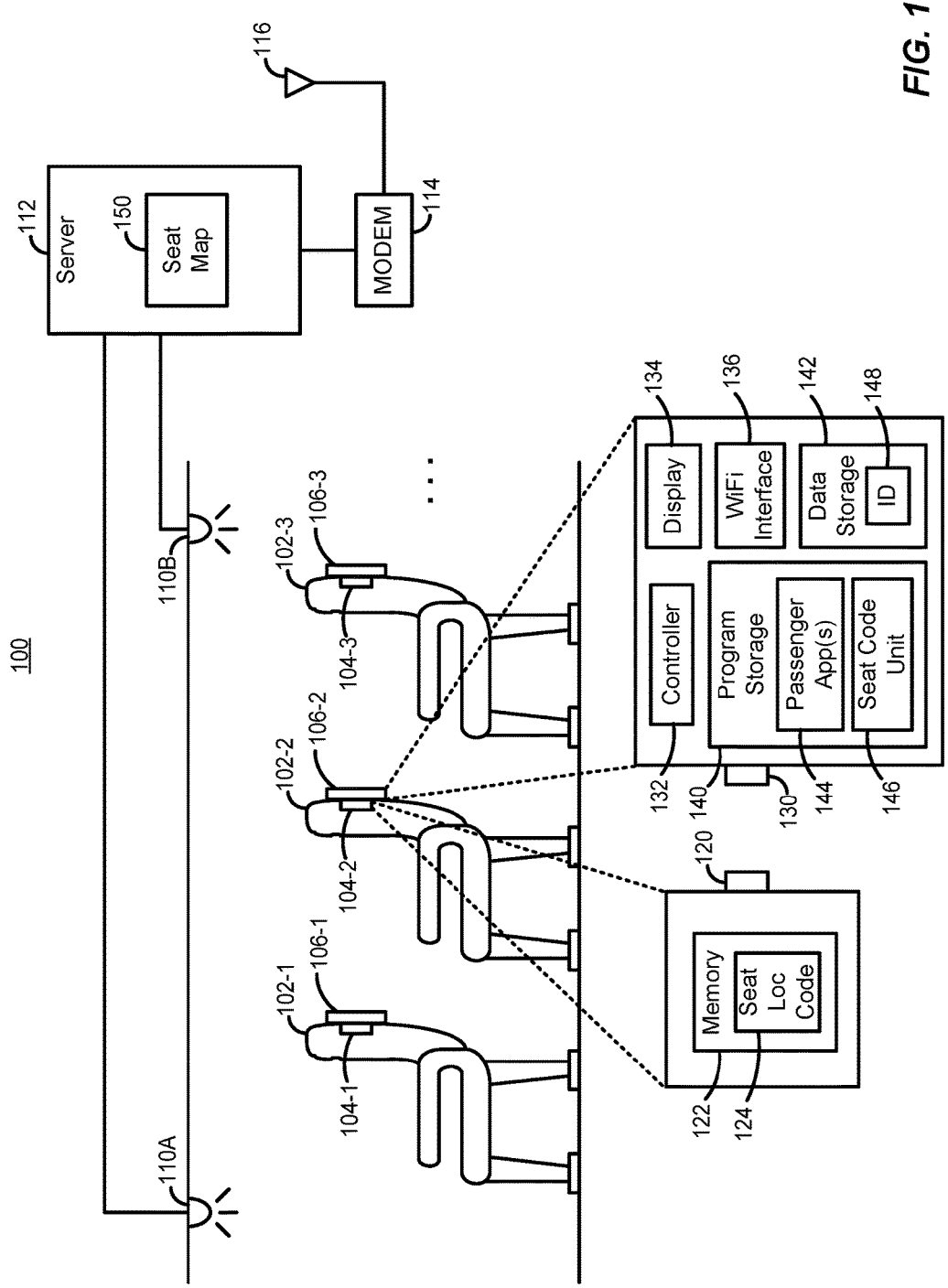
FIG. 1 depicts an exemplary on-board system for efficiently and accurately associating passenger seat-back units with particular seats of a passenger vehicle, using a seat location code stored in a programmable memory of a mounting unit.

FIG. 1 illustrates an example on-board system 100 of a vehicle, according to one implementation. For ease of explanation, on-board system 100 is for the most part described herein as being on-board an aircraft. However, the techniques and principles described herein equally apply to other types of vehicles that accommodate multiple passengers, such as buses, trains, boats, ships, subway cars, military transport vehicles, other air-borne, water-borne, or land-borne vehicles, and vehicles that are suitable for space travel.

On-board system 100 includes a number of seats 102, one, some, or all of which carry a respective seat-back mounting unit 104 that is physically coupled to a respective seat-back passenger unit 106. Seat-back passenger units 106 may be in-flight entertainment devices that enable passengers to watch movies and/or television programming (e.g., via IPTV), for example. Alternatively, or in addition, seat-back passenger units 106 may enable passengers to access various other services, such as Internet browsing, placing drink and/or food orders, and/or ordering "duty-free" items. As seen in FIG. 1, each of seat-back passenger units 106 is positioned on a back surface of one of seats 102. For example, seat-back passenger unit 106-1 is physically coupled to seat-back mounting unit 104-1, which is in turn affixed to the back of seat 102-1. Seat-back mounting units 104 may be partially embedded within seats 102, and/or may be affixed to seats 102 via screws, clips, and/or other suitable types of hardware.

In an alternative embodiment, mounting units 104 (and thus, passenger units 106) may instead be positioned in a manner different than that shown in FIG. 1. For example, mounting unit 106-1 may instead be affixed to an armrest of seat 102-2 (e.g., with mounting unit 106-1 including an extendable and/or rotatable arm that can be positioned by a passenger sitting in seat 102-2).

On-board system 100 also includes a number of wireless access points 110, which are communicatively coupled (e.g., via a wired connection) to an on-board server 112. While FIG. 1 shows two wireless access points 110A and 110B, more or fewer may be included on-board the vehicle. Wireless access points 110 operate according to one or more wireless local area network (WLAN) communication protocols, such as one or more IEEE 802.11 (WiFi) protocols (e.g., 802.11b, 802.11g, 802.11ac, etc.). In the implementation shown in FIG. 1, on-board server 112 is also coupled to a modem 114, which is in turn coupled to an antenna 116. Modem 114 and antenna 116 may generally be configured to enable on-board server 112 to communicate with systems/nodes/devices that are not located on the vehicle, e.g., via one or more satellite and/or air-to-ground long-range communication links. In some implementations, on-board system 100 includes more than one modem 114 and/or more than one antenna 116. In still other implementations (e.g., where no off-vehicle connectivity is required), modem 114 and antenna 116 are not included in on-board system 100.

On-board server 112 (e.g., an Airborne Control Processor Unit (ACPU)) may include one or more computing devices, and may generally manage various communication-related (and possibly other) operations. If seat-back passenger units 106 are configured to provide Internet browsing capabilities, real-time programming, and/or other services requiring access to remote content, for example, on-board server 112 may receive passenger selections (made at seat-back passenger units 106) via wireless access points 110, retrieve the corresponding content from a ground source via modem 114 and antenna 116, and provide the retrieved content to seat-back passenger units 106 via wireless access points 110. As another example, if seat-back passenger units 106 are also (or instead) configured to support passenger orders (e.g., for food and/or drinks), on-board server 112 may receive passenger selections (made at seat-back passenger units 106) via wireless access points 110, and cause the orders to be displayed to one or more cabin attendants (e.g., via a network and device(s) not shown in FIG. 1).

Each of seat-back mounting units 104 includes a hardware connector 120 that permits the mounting of one of seat-back passenger units 106, as discussed further below. Each of seat-back mounting units 104 also includes a memory 122 storing a seat location code 124 indicative of the physical location of a corresponding one of seats 102. Seat location code 124 may be a seat number/label such as "12A" or "15C," for example, or may be a code that on-board server 112 can map to the seat number/label, for example. Precisely which of seats 102 "corresponds" to a given seat location code 124 depends upon the implementation. In the implementation shown in FIG. 1 with mounting units 104 being disposed upon the backs of seats 102, for example, the corresponding seat 102 for a given mounting unit 104 and seat location code 124 is not the seat 102 to which the mounting unit 104 is affixed, but rather the seat 102 directly behind the mounting unit 104. Referring specifically to mounting unit 104-2, for example, seat location code 124 would be indicative of the physical location of seat 102-3, rather than the physical location of seat 102-2 to which mounting unit 104-2 is affixed. Memory 122 may be any suitable type of non-volatile memory. Preferably, however, memory 122 is a programmable memory, such as an EEPROM, thereby allowing seat location code 124 to be reconfigured (e.g., manually) if and when the respective mounting unit 104 is moved to a new seat 102, or if and when the entire seat 102 (including the respective mounting unit 104) is moved to a new location.

Each of seat-back passenger units 106 includes a hardware connector 130 that is configured to mate to connector 120 of a respective seat-back mounting unit 104. Connectors 120, 130 may utilize any suitable type of connector hardware technology, such as a posts and holes, clips and clip coupling areas, and so on. In the implementation of FIG. 1, connectors 120, 130 also provide one or more electrical connections (e.g., conductive pins, wires, traces, etc.) between each pair of seat-back mounting units 104 and seat-back passenger units 106.

Each of seat-back passenger units 106 also includes a controller 132, a display 134, a WiFi interface 136, a program storage 140, and a data storage 142. Controller 132 may be a single processor device (e.g., chip) or may include multiple processor devices, and generally controls the operation of the respective seat-back passenger unit 106 by executing instructions stored in program storage 140. Display 134 includes a screen and associated hardware (and possibly firmware, etc.) for presenting visual content to a passenger, and may utilize any suitable display technology. For example, display 134 may be an LED display, OLED display, LCD display, and so on. WiFi interface 136 includes hardware, firmware, and/or software that enables the respective seat-back passenger unit 106 to communicate (transmit and receive data) via one or more of wireless access points 110 using the appropriate WLAN protocol (e.g., IEEE 802.11b, 802.11g, 802.11ac, etc.).

Program storage 140 includes one or more types of non-volatile memory (e.g., a hard disk, solid state memory, etc.), and stores one or more passenger applications 144. Passenger applications 144 are generally configured to facilitate the provision of content and/or services via the respective seat-back passenger unit 106. If seat-back passenger units 106 are configured to provide Internet browsing capabilities, for example, one of passenger applications 144 may be a web browser application. As another example, if seat-back passenger units 106 are configured to display movies or other programming, one of passenger applications 144 may generate a graphical user interface (GUI) that enables a passenger to select a desired movie/program, cause the selection to be communicated to on-board server 112 via WiFi interface 136 and one of wireless access points 110, and display the selected movie/program after (or while) the corresponding content is received from on-board server 112. As yet another example, if seat-back passenger units 106 are configured to support cabin attendant services such as food or drink orders, one of passenger applications 144 may generate a GUI that enables a passenger to select a specific drink or food item, and cause the selection to be communicated to on-board server 112 via WiFi interface 136 and one of wireless access points 110.

Program storage 140 also stores a seat code unit 146, which generally operates to obtain seat location code 124 from the respective mounting unit 104. The operation of seat code unit 146 is discussed in further detail below.

Data storage 142 includes one or more types of non-volatile memory (e.g., a hard disk, solid state memory, etc.), and/or one or more types of volatile memory. Data storage 142 may be the same as the memory used for program storage 140, or a different memory. Generally, data storage 142 may store various types of data used by, and/or output by, one or more of the applications stored in program storage 140. Included among this stored data is a passenger unit identifier 148, which generally serves to uniquely identify (in a global or local sense) the respective seat-back passenger unit 106. For example, passenger unit identifier 148 may be a medium access control (MAC) address of the respective seat-back passenger unit 106. Alternatively, passenger unit identifier 148 may be an IP address, serial number, or any other sufficiently unique identifier of the respective seat-back passenger unit 106.

Regardless of the type (or types) of content and/or passenger services offered via seat-back passenger units 106, it may be advantageous to associate a given passenger unit 106 with a specific seat 102. If seat-back passenger units 106 are configured to provide Internet browsing capabilities or on-demand movies or programming, for example, knowledge of the seat may be needed in order for the vehicle owner (e.g., the airline/carrier) to link associated fees/charges to the passenger sitting in that seat. As another example, if seat-back passenger units 106 are configured to support in-cabin services such as food or drink orders, knowledge of the seat may be needed so that a cabin attendant may bring the ordered food/drink to the passenger who placed the order. As yet another example, in an implementation where seat-back passenger units 106 can inform on-board server 112 (e.g., via wireless access points 110) of faulty operation (e.g., via error codes, or simple non-responsiveness, etc.), knowledge of the seat may be needed so that maintenance personnel (or a cabin attendant) can quickly locate and swap out (or repair) the faulty passenger unit 106.

Moreover, it is generally advantageous for on-board server 112 to learn the seat association in a manner that is relatively fast, efficient, and not prone to human error. For example, it may be advantageous to avoid manual programming of seat-back passenger units 106 (e.g., manually entering the seat numbers or other seat location codes for seats 102 associated with the passenger units 106) when seat-back passenger units 106 are first added to respective seat-back mounting units 104. This may be particularly important in implementations where seat-back passenger units 106 can be replaced and/or changed from one seat 102 to another.

To illustrate the process by which a seat association is learned in the implementation of FIG. 1, a scenario will now be described in which seat-back passenger unit 106-2 is mounted to seat-back mounting unit 104-2 on seat 102-2. After an individual (e.g., maintenance or other personnel of an entity owning or managing a fleet that includes the vehicle containing on-board system 100) physically mounts/affixes seat-back passenger unit 106-2 to seat-back mounting unit 104-2, seat code unit 146 (executed by controller 132) retrieves seat location code 124 from memory 122 of seat-back mounting unit 104-2. If seat-back passenger unit 106-2 is already powered up when mounted, seat code unit 146 may obtain seat location code 124 automatically upon detecting an electrical connection via connectors 120, 130, for example, with no further action by the installer or anyone else being required. Alternatively, the installer may need to take one or more actions after mounting in order to initiate the retrieval of seat location code 124. For example, the installer may power on seat-back passenger unit 106-2 after mounting is completed (if not yet powered up), and/or may select one or more options via a user interface presented on display 134 (e.g., by pressing a virtual "Configure" or "Identify Seat" button, etc.).

Seat code unit 146 may also retrieve passenger unit identifier 148 from data storage 148, and generate a message that includes both seat location code 124 and passenger unit identifier 148. Seat code unit 146 may then cause the message (or, in an alternative embodiment, a first message with seat location code 124 and a second, subsequent message with passenger unit identifier 148, or vice versa) to be transmitted to on-board server 112 via WiFi interface 136 and one of wireless access points 110.

After receiving seat location code 124 and passenger unit identifier 148, on-board server 112 may generate seat assignment data indicating that seat-back passenger unit 106-2 is associated with seat 102-3, and store that data in a seat map

150 residing in a local, non-volatile memory of on-board server 112 (or another, external memory that is accessible by on-board server 112). The seat assignment data may be data of a relational database that associates seat location code 124 (or other data corresponding to seat location code 124 and seat 102-3) with passenger unit identifier 148 (or other data corresponding to passenger unit identifier 148), for example.

On-board server 112 may then use that assignment data in seat map 150 for various purposes, as discussed above. For example, on-board server 112 may receive a message from seat-back passenger unit 106-2 (via one of wireless access points 110) that includes the respective passenger unit identifier 148 (e.g., a source MAC address in a packet header) as well as a drink order (e.g., in the packet payload). On-board server 112 may then use the received passenger unit identifier 148 as a key to a relational database or index in seat map 150, to learn that seat 102-3 is associated with that order. On-board server 112 may then cause the order and the seat number of seat 102-3 to be displayed to a cabin attendant.

As another example, on-board server 112 may receive a message from seat-back passenger unit 106-2 (via one of wireless access points 110) that includes the respective passenger unit identifier 148 (e.g., a source MAC address in a packet header) as well as a movie selection made by the passenger (e.g., in the packet payload). In addition to retrieving and providing the movie to seat-back passenger unit 106-2, on-board server 112 may use the received passenger unit identifier 148 as a key to a relational database or index in seat map 150, to learn that seat 102-3 is associated with that movie selection. On-board server 112 may then inform another device and/or application (e.g., transmit to a ground-based system using modem 114 and antenna 116) that any fee for the movie should be charged to the passenger in seat 102-3.

As yet another example, on-board server 112 may receive a message from seat-back passenger unit 106-2 (via one of wireless access points 110) that includes the respective passenger unit identifier 148 (e.g., a source MAC address in a packet header) as well as an error/fault indicator (e.g., in the packet payload). Or, on-board server 112 may attempted to "ping" seat-back passenger unit 106-2, and not receive any response. On-board server 112 may then use the passenger unit identifier 148 (as received from seat-back passenger unit 106-2, or as already known by on-board server 112) as a key to a relational database or index in seat map 150, to learn that seat 102-3 is associated with the faulty unit. On-board server 112 may then cause the seat number of seat 102-3 to be displayed to maintenance personnel or a cabin attendant along with a descriptive error message or code, and/or inform another device and/or application (e.g., transmit to a ground-based system using modem 114 and antenna 116) that the unit at the seat number of seat 102-3 is in need of repair or replacement.

If seat-back passenger unit 106-2 were then disconnected and instead affixed to seat-back mounting unit 104-1 (e.g., if seat-back passenger unit 106-1 were removed due to faulty operation, or the need for an upgrade, etc.), the same process may be repeated, but with seat location code 124 of seat-back mounting unit 104-1 now corresponding to seat 102-2. That is, after receiving passenger unit identifier 148 and the new seat location code 124 from seat-back passenger unit 106-2, on-board server 112 may generate seat assignment data reflecting that seat-back passenger unit 106-2 is associated with seat 102-2, and store that data in seat map 150 (e.g., by overwriting old assignment data for seat 102-2).

In certain alternative implementations, seat-back passenger unit 106-2 obtains seat location code 124 by means other than that discussed above in connection with FIG. 1. Some examples of these alternatives are depicted in FIGS. 2 through 5. In FIGS. 2 through 5, components (devices, data, etc.) having a reference number identical to a reference number used in FIG. 1 denote the same component as described in connection with FIG. 1, unless (and only to the extent to which) it is otherwise stated below. For example, the operation of seat code unit 146 in FIGS. 2 through 5 differs in various ways from the operation of seat code unit 146 in FIG. 1, as discussed below.

Figure 2:
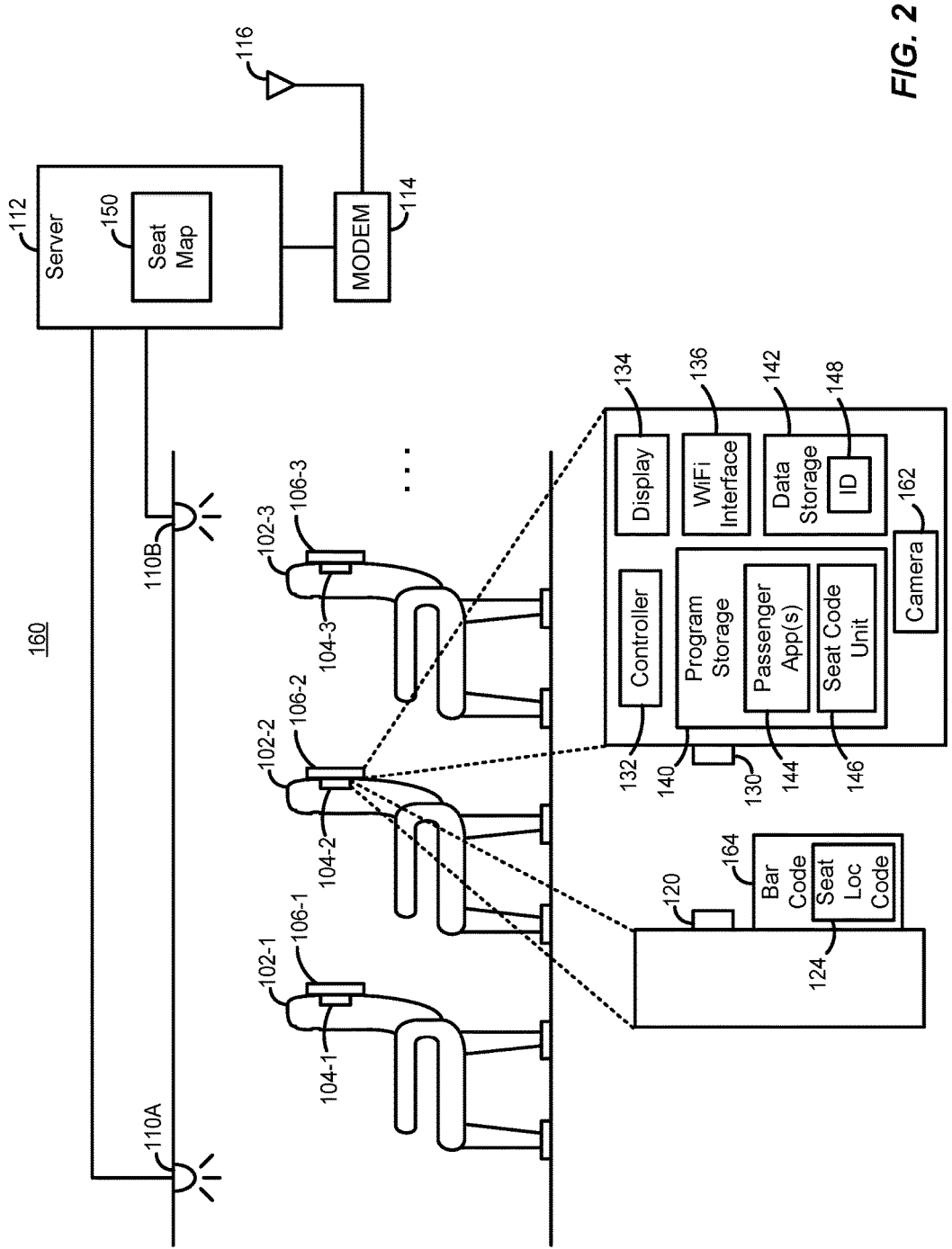
FIG. 2 depicts an alternative implementation of the on-board system of FIG. 1, in which a scanned image is used to convey the seat location code.

Referring first to an on-board system 160 of FIG. 2, each seat-back passenger unit 106 includes a camera 162. Camera 162 may be any suitable type of camera, such as a semiconductor charge-coupled device (CCD) or complementary metal-oxide-semiconductor (CMOS) camera, for example. While not shown in FIG. 2, each seat-back passenger unit 106 may also include a light source that may be manually and/or automatically activated as needed to capture images in low-light conditions. In other implementations, camera 162 may be a different type of image sensor, such as a laser scanner. Unlike the implementation of FIG. 1, seat-back mounting units 104 may not include any electronics, and/or connectors 120, 130 may not provide an electrical connection. Instead, a bar code 164 may be affixed to (e.g., printed on, stamped on, glued on, etc.) a visible, external surface of each seat-back mounting unit 104. As the term is used herein, an "external" surface may be one that requires some moderate amount of manipulation to expose (e.g., by lifting a cover or flap, etc.). Bar code 164 is, or includes, a visual representation/coding of seat location code 124. In alternative implementations, bar code 164 may instead be a QR code, or any other type of visual code (e.g., the seat number itself) that is capable of representing seat location code 124 and is can be scanned/captured by camera 162.

To illustrate the process by which a seat association is learned in the implementation of FIG. 2, a scenario will now be described in which seat-back passenger unit 106-2 is mounted to seat-back mounting unit 104-2 on seat 102-2. Prior to affixing seat-back passenger unit 106-2 to seat-back mounting unit 104-2 (via connectors 120, 130), a person installing seat-back passenger unit 106-2 may manually operate camera 162 to scan (e.g., capture an image of) bar code 164. Alternatively, bar code 164 may be positioned such that, upon proper mating of connectors 120, 130, bar code 164 is in the field of view of camera 162. In this latter implementation, camera 162 may scan bar code 146 after seat-back passenger unit 106-2 is affixed to seat-back mounting unit 104-2, either in response to a manual command by the installer or automatically. The scan may be automatic, for example, if seat code unit 146 detects that connectors 120, 130 have mated (e.g., by way of connector 120 causing pins or traces on connector 130 to be grounded or shorted together, etc.), and triggers an image capture in response to detecting the mating. In still other implementations, bar code 164 (or QR code, seat number, etc.) may be positioned somewhere other than on seat-back mounting unit 104-2. For example, bar code 164 may be positioned proximate to the upper stowage bin area (e.g., on or near the door to the bin/compartment).

Once an image of bar code 164 has been captured, seat code unit 146 may temporarily store the image in data storage 142, and cause the image (and passenger unit identifier 148) to be transmitted to on-board server 112 via WiFi interface 136 and one of wireless access points 110. On-board server 112 may then analyze bar code 164 to determine seat location code 124. Alternatively, seat code unit 146 may locally process the image of bar code 164 to derive seat location code 124, and then cause seat location code 124 to be transmitted to on-board server 112 without any accompanying image. In still other implementations, camera 162 (or some other type of image sensor) may not capture and/or store an entire image of bar code 164, and instead seat code unit 146 may analyze bar code 164 in real-time as different segments of bar code 164 are being scanned.

After receiving or determining seat location code 124, and receiving passenger unit identifier 148, on-board server 112 may generate seat assignment data reflecting that seat-back passenger unit 106-2 is associated with seat 102-3, store that data in seat map 150, and use the seat map 150 in various ways, as discussed above in connection with FIG. 1.

Figure 3:
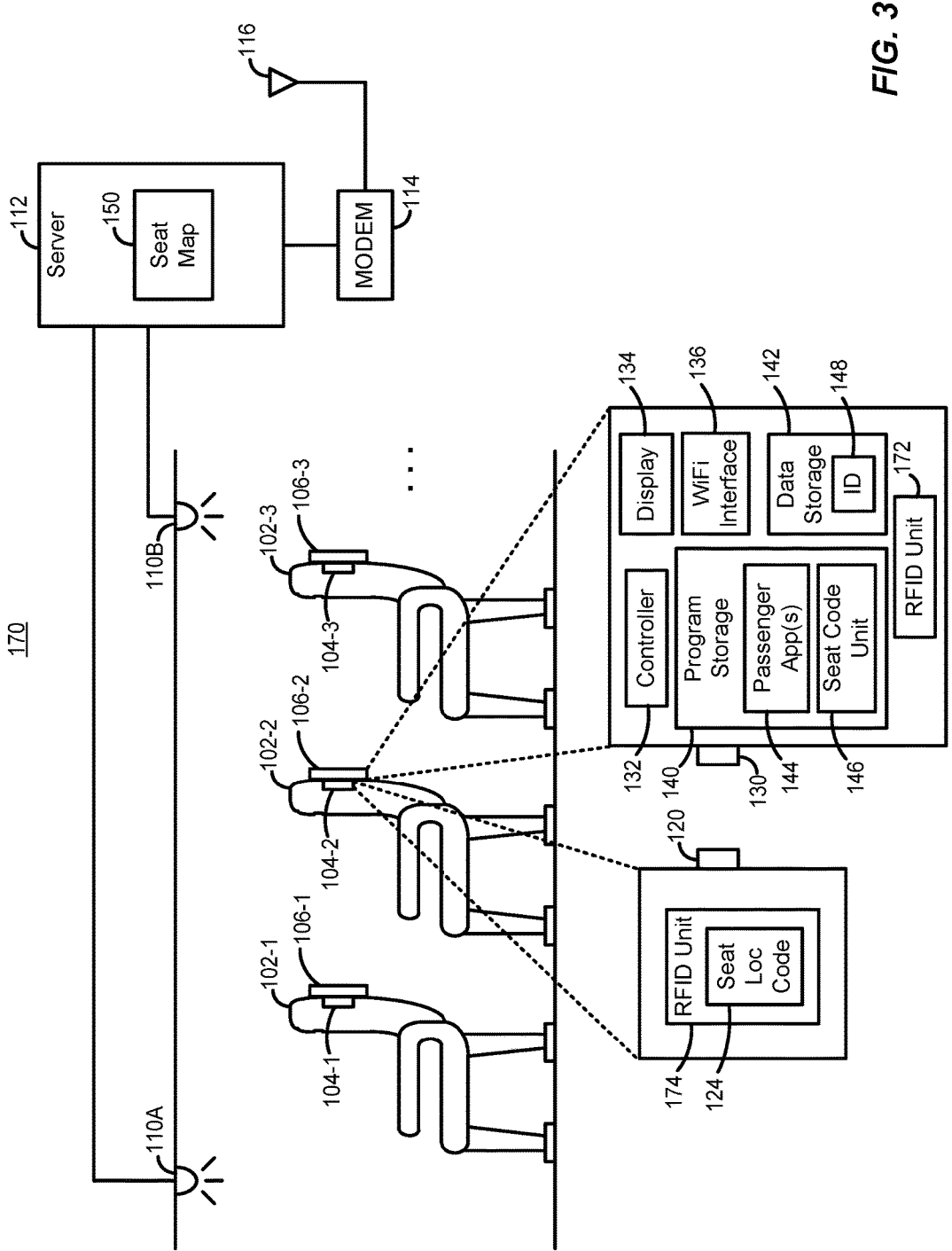
FIG. 3 depicts another alternative implementation of the on-board system of FIG. 1, in which RFID units are used to convey the seat location code.

Referring next to an on-board system 170 of FIG. 3, each seat-back passenger unit 106 includes a radio frequency identification (RFID) unit 172, and each seat-back mounting unit 104 includes an RFID unit 174. Specifically, RFID unit 172 may be an RFID reader, and RFID unit 174 may be an RF tag containing an RFID microchip and storing seat location code 124. RFID units 172, 174 may operate in the 13.56 MHz band or another suitable frequency band, and may utilize capacitive of inductive coupling. RFID unit 174 may be passive, or may be an active unit powered by the electromagnetic field of RF unit 172, for example.

To illustrate the process by which a seat association is learned in the implementation of FIG. 3, a scenario will now be described in which seat-back passenger unit 106-2 is mounted to seat-back mounting unit 104-2 on seat 102-2. Prior to, while, and/or after affixing seat-back passenger unit 106-2 to seat-back mounting unit 104-2 (via connectors 120, 130), seat code unit 146 may detect the presence of RFID unit 174 via signals detected by RFID unit 172. In various implementations, a manual trigger (e.g., pressing a virtual button shown on display 134) may or may not be required for seat code unit 146 to start "sniffing" for RFID unit 174. RFID unit 174 may use seat location code 124 to modulate the signal detected by RFID unit 172, such that seat code unit 146 and/or RFID unit 172 are able to derive seat location code 124 from the detected signal.

Once seat code unit 146 has determined seat location code 124, seat code unit 146 may temporarily store seat location code 124 in data storage 142, and cause seat location code 124 and passenger unit identifier 148 to be transmitted to on-board server 112 via WiFi interface 136 and one of wireless access points 110. After receiving seat location code 124 and passenger identification unit 148, on-board server 112 may generate seat assignment data reflecting that seat-back passenger unit 106-2 is associated with seat 102-3, store that data in seat map 150, and use the seat map 150 in various ways, as discussed above in connection with FIG. 1.

Figure 4:
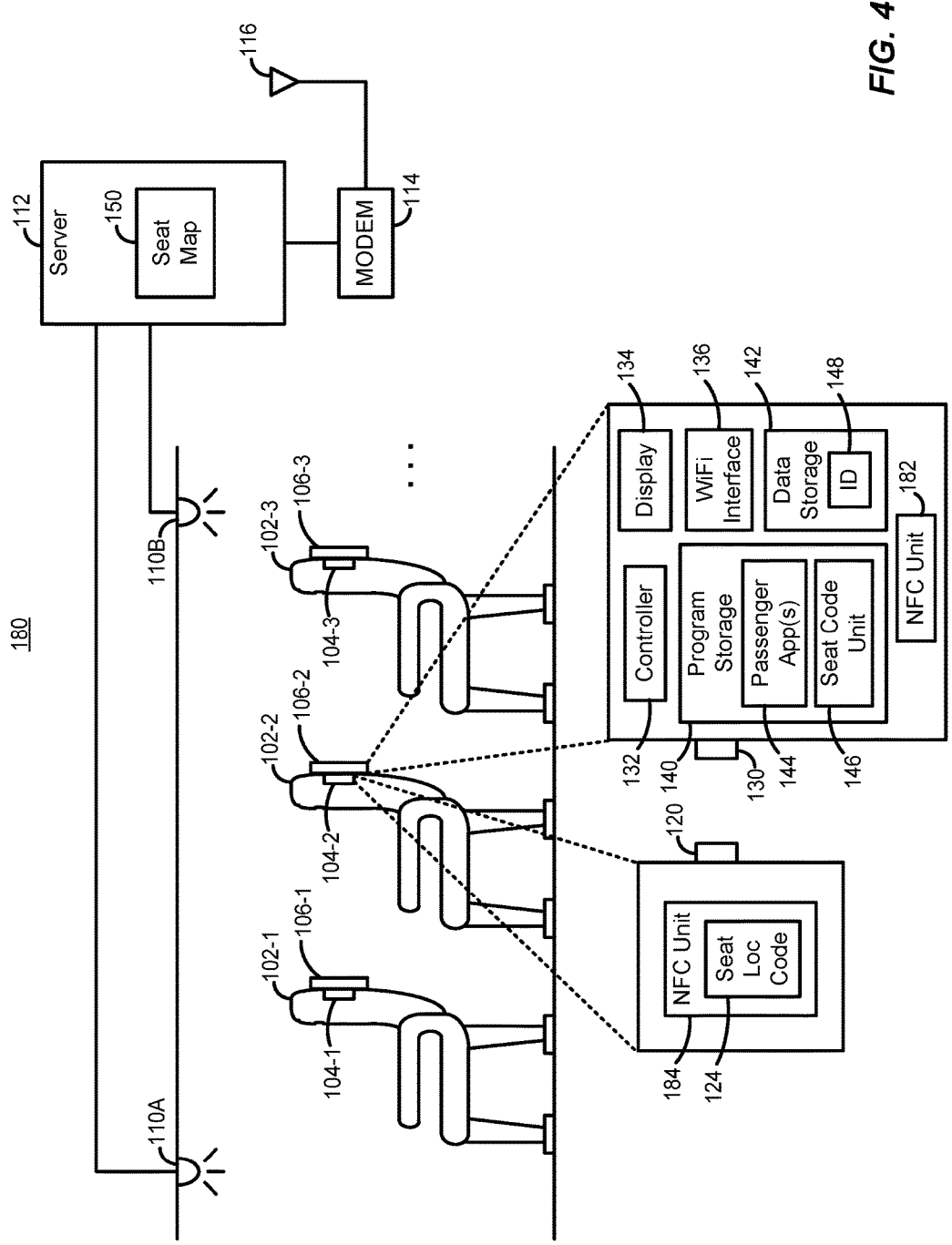
FIG. 4 depicts another alternative implementation of the on-board system of FIG. 1, in which NFC units are used to convey the seat location code.

Referring next to an on-board system 180 of FIG. 4, each seat-back passenger unit 106 includes a near-field communication (NFC) unit 182, and each seat-back mounting unit 104 includes an NFC unit 184 storing seat location code 124. Specifically, NFC unit 182 may be an "initiator" unit, and NFC unit 184 may be a "target" unit that is self-powered or powered by NFC unit 182. NFC units 182, 184 may utilize any suitable frequency band, and may utilize capacitive of inductive coupling.

To illustrate the process by which a seat association is learned in the implementation of FIG. 4, a scenario will now be described in which seat-back passenger unit 106-2 is mounted to seat-back mounting unit 104-2 on seat 102-2. Prior to, while, and/or after affixing seat-back passenger unit 106-2 to seat-back mounting unit 104-2 (via connectors 120, 130), seat code unit 146 may detect the presence of NFC unit 184 via signals detected by NFC unit 182. In various implementations, a manual trigger (e.g., pressing a virtual button shown on display 134) may or may not be required for seat code unit 146 to start "sniffing" for NFC unit 184. Seat code unit 146 may request a seat location code (via NFC unit 182) from NFC unit 184, and NFC unit 184 may respond by sending seat location code 124.

Once seat code unit 146 has determined seat location code 124, seat code unit 146 may temporarily store seat location code 124 in data storage 142, and cause seat location code 124 and passenger unit identifier 148 to be transmitted to on-board server 112 via WiFi interface 136 and one of wireless access points 110. After receiving seat location code 124 and passenger identification unit 148, on-board server 112 may generate seat assignment data reflecting that seat-back passenger unit 106-2 is associated with seat 102-3, store that data in seat map 150, and use the seat map 150 in various ways, as discussed above in connection with FIG. 1.

Figure 5:
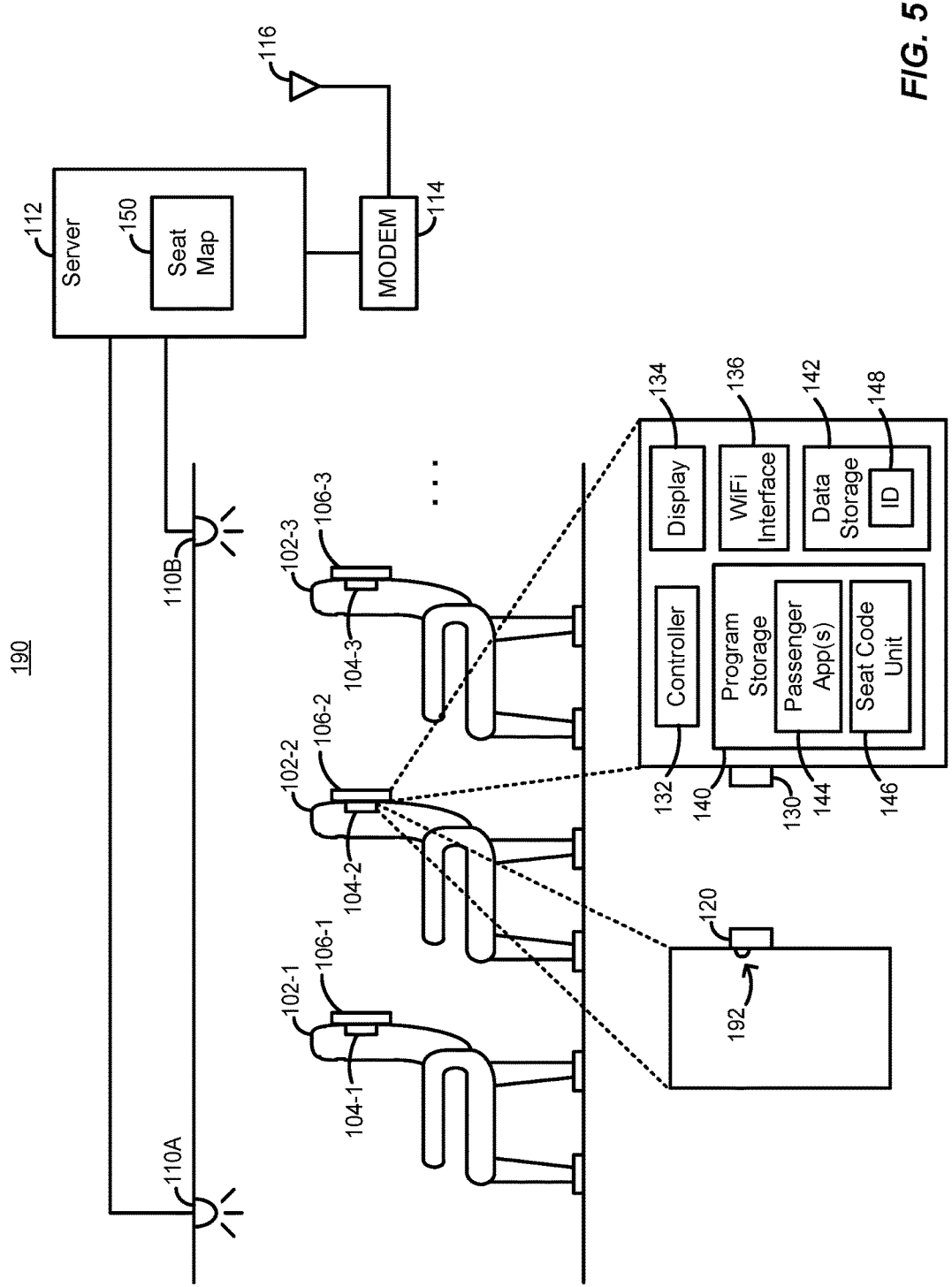
FIG. 5 depicts another alternative implementation of the on-board system of FIG. 1, in which a configuration of the mounting unit connector is used to convey the seat location code.

Referring next to an on-board system 190 of FIG. 5, connector 120 of each seat-back mounting unit 104 includes a number of different electrical connections (e.g., pins, traces, etc.), and is arranged in a physical and electrical configuration 192 that reflects seat location code 124 (not shown in FIG. 5). For example, configuration 192 may correspond to settings of a DIP switch of seat-back mounting unit 104-2 that grounds certain pins or traces on connector 120, and/or shorts certain pins or traces together. As another example, configuration 192 may correspond to the arrangement of jumper cables or tabs within seat-back mounting unit 104-2 that short certain pins or traces together. As yet another example, configuration 192 may correspond to the programming of one or more switching components (e.g., semiconductor switches) within seat-back mounting unit 104-2, where the switches operate to ground and/or short various pins or traces.

To illustrate the process by which a seat association is learned in the implementation of FIG. 5, a scenario will now be described in which seat-back passenger unit 106-2 is mounted to seat-back mounting unit 104-2 on seat 102-2. After affixing seat-back passenger unit 106-2 to seat-back mounting unit 104-2 (via connectors 120, 130), seat code unit 146 may detect configuration 192 of connector 120. For example, seat code unit 146 may detect which pins/traces of connector 120 have a logical "high" or "low" voltage level, which pins/traces are shorted together or grounded, etc. Seat code unit 146 may directly map configuration 192 to seat location code 124 based on a priori information, and temporarily store seat location code 124 in data storage 142. Seat code unit 146 may also retrieve passenger unit identifier 148, and cause seat location code 124 and passenger unit identifier 148 to be transmitted to on-board server 112 via WiFi interface 136 and one of wireless access points 110. After receiving seat location code 124 and passenger identification unit 148, on-board server 112 may generate seat assignment data reflecting that seat-back passenger unit 106-2 is associated with seat 102-3, store that data in seat map 150, and use the seat map 150 in various ways, as discussed above in connection with FIG. 1.

It is to be understood that still other implementations, not shown in FIGS. 1 through 5, are also possible. For example, bar code 164 of FIG. 2, RFID unit 174 of FIG. 3, or NFC unit 184 of FIG. 4 may not be associated with any of mounting units 104. For example, bar code 164, RFID unit 174, or NFC unit 184 may instead be included on or within an armrest of one of seats 102 (e.g., the seat 102 from which the display 134 of the passenger unit 106 being installed will be viewed), or under that seat 102, etc.

Figure 6:
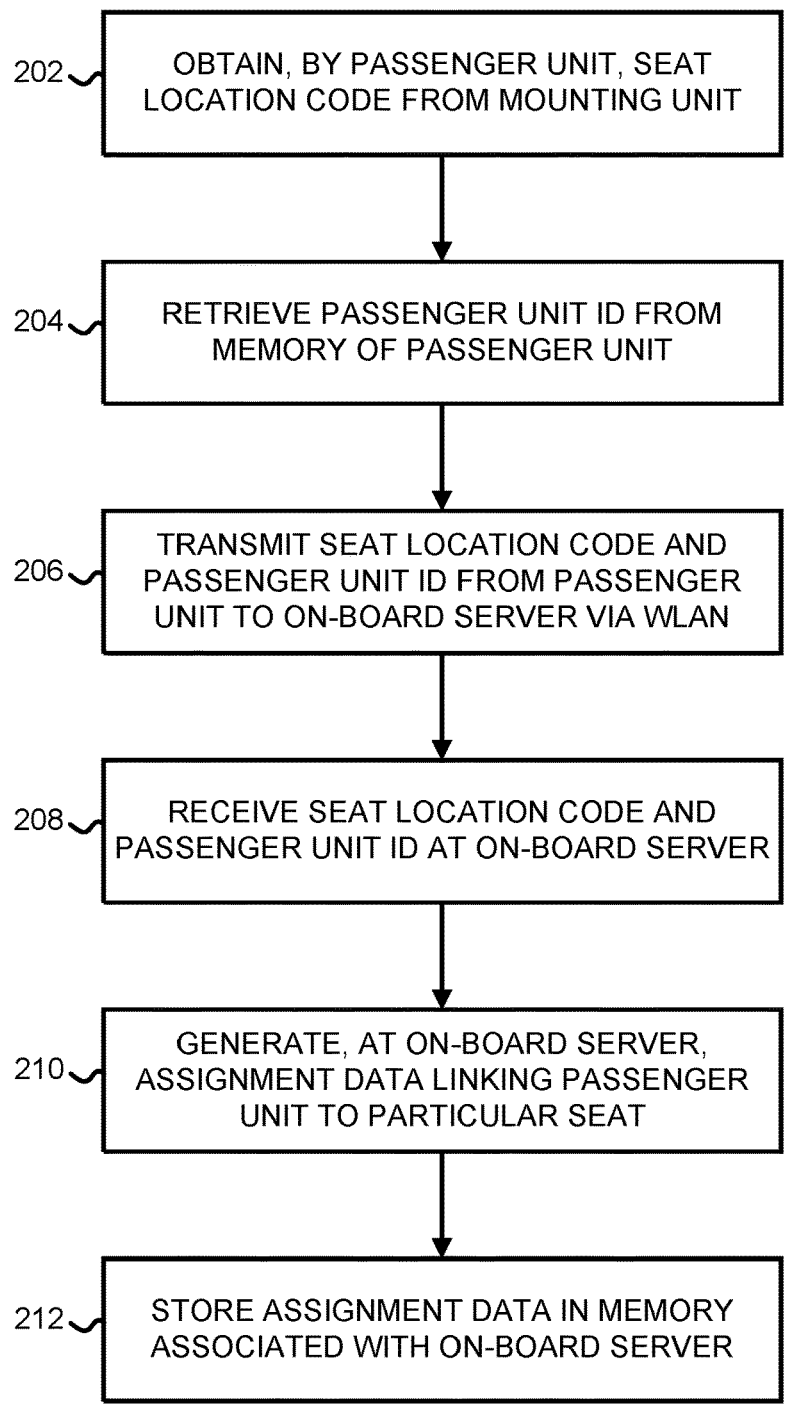
FIG. 6 depicts an exemplary method, implemented by a computing system located on-board a passenger vehicle, of efficiently and accurately associating passenger units with particular seats of the vehicle.

FIG. 6 depicts an exemplary method 200 for efficiently and accurately associating passenger units with particular seats of a passenger vehicle. The method 200 may be implemented by a computing system located on-board a passenger vehicle having a plurality of seats (e.g., an aircraft, bus, train, subway, military transport vehicle, space craft, etc.), such as the on-board system of any one of FIGS. 1 through 5, for example. Various components of FIGS. 1 through 5 are referred to in the description of the method 200 for purposes of providing specific, non-limiting examples.

In the method 200, a seat location code (e.g., seat location code 124) is obtained by a passenger unit (e.g., one of seat-back passenger units 106) from a mounting unit (e.g., one of seat-back mounting units 104) (block 202). The mounting unit may be installed on a particular seat of the plurality of seats (e.g., on an armrest), or proximate to that seat (e.g., on the back of the seat immediately in front of that seat). The passenger unit is configured to physically couple (and in some implementations, electrically couple) to the mounting unit. The seat location code may be a seat number or code with which the seat is also visually labeled (e.g., "10," "12A," "F," etc.), to allow passengers to find the correct seat, or may be a number or code that is purely for internal seat assignment purposes.

In some implementations, block 202 includes reading the seat location code from a memory of the mounting unit (e.g., memory 122) after the passenger unit has been physically and electrically coupled to the mounting unit. In other implementations, block 202 includes receiving the seat location code from the mounting unit via an RFID interface of the passenger unit (e.g., RFID unit 172) and an RFID interface of the mounting unit (e.g., RFID unit 174). In still other implementations, block 202 includes receiving the seat location code from the mounting unit via an NFC interface of the passenger unit (e.g., NFC unit 182) and an NFC interface of the mounting unit (e.g., NFC unit 184). In still other implementations, block 202 includes scanning, via an imaging sensor of the passenger unit (e.g., camera 162), a visual representation of the seat location code on an exterior surface of the mounting unit (e.g., bar code 164). In still other implementations, block 202 includes detecting a hard-wired configuration of a connector of the mounting unit (e.g., detecting configuration 192 of connector 120).

A passenger unit identifier (e.g., passenger unit identifier 148) is retrieved, by the passenger unit, from a local memory (e.g., data storage 142) of the passenger unit (block 204). The passenger unit identifier may be a MAC address, for example, or any other identifier that uniquely (at least within the context of the passenger vehicle) identifies the passenger unit. Block 204 may occur before, after, or concurrently with block 202.

The seat location code obtained at block 202, and the passenger unit identifier retrieved at block 204, are transmitted from the passenger unit to an on-board server (e.g., on-board server 112) (block 206). The seat location code and passenger unit identifier may be sent in a single message, or in separate messages, and may be transmitted via a WLAN (e.g., a WiFi network). The seat location code and passenger unit identifier are then received at the on-board server (block 208), e.g., via the WLAN.

At the on-board server, assignment data is generated (block 210) linking the passenger unit to the particular seat. The assignment data may include the seat location code and passenger unit identifier, or proxies for one or both of those pieces of information, and may be generated in the format of entries in a relational database (e.g., with metadata corresponding to the appropriate database language) or another suitable format.

The assignment data is stored in a memory associated with the on-board server (block 212). If the assignment data includes entries of a relational database, for example, the assignment data may be added to the relational database. The assignment data may be stored with a number of other sets of assignment data, each associating a different seat to a different passenger unit (e.g., within seat map 150). The memory may be a local memory of the on-board server, an external memory of the on-board server (e.g., a memory connected by a cable), or a memory of another device or system that is communicatively coupled to the on-board server.

Figure 7:
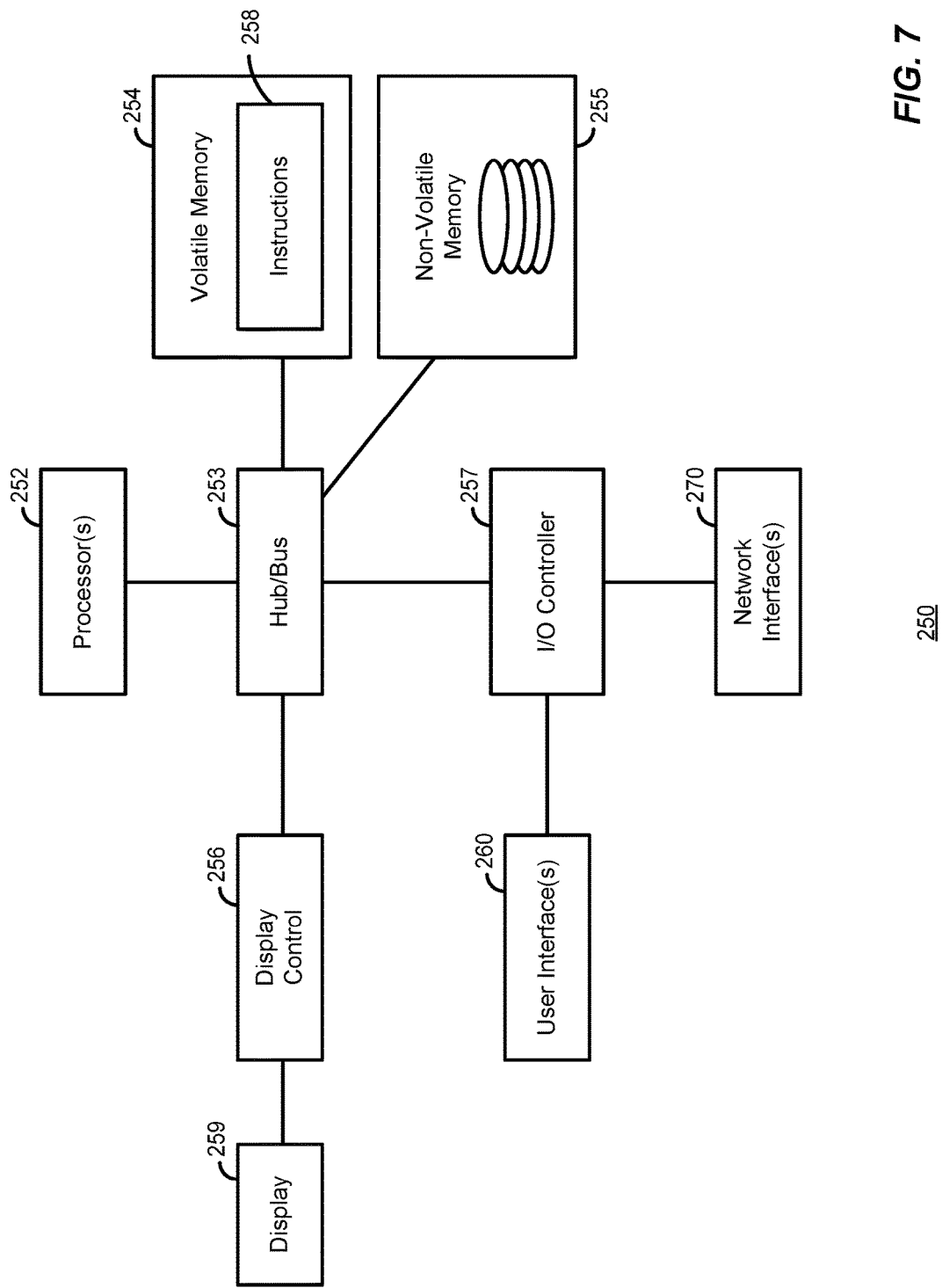
FIG. 7 is a block diagram of an exemplary computing device that may be utilized in a system for efficiently and accurately associating passenger seat-back units with particular seats of a passenger vehicle.

FIG. 7 is a block diagram of an exemplary computing device 250 that may be utilized in a system for efficiently associating passenger units with particular seats of a passenger vehicle. For example, one or more computing devices similar to computing device 250 may be particularly configured to be utilized as one of passenger units 106, or as on-board server 112.

Computing device 250 may include, for example, one more processors 252, and one or more buses or hubs 253 that connect the processor(s) 252 to other elements of computing device 250, such as a volatile memory 254, a non-volatile memory 255, a display controller 256, and an I/O controller 257. Volatile memory 254 and non-volatile memory 255 may each include one or more non-transitory, tangible computer readable storage media such as random access memory (RAM), read only memory (ROM), FLASH memory, a biological memory, a hard disk drive, solid state memory, a digital versatile disk (DVD) disk drive, etc.

In an embodiment, volatile memory 254 and/or non-volatile memory 255 may store instructions 258 that are executable by processor(s) 252. For example, in a computing device particularly configured as passenger unit 106-2, instructions 258 may be the instructions of passenger application(s) 144 and/or seat code unit 146, as described above. As another example, in a computing device 250 particularly configured as on-board server 112, instructions 258 may be the instructions that generate the assignment data linking seats 102 to passenger devices 106, store the assignment data in seat map 150, and/or make use of seat map 150, as described above. Indeed, each of the modules, applications and engines described herein can correspond to a different set of machine readable instructions for performing one or more functions described above. These modules need not be implemented as separate software programs, procedures or modules, and thus various subsets of these modules can be combined or otherwise re-arranged in various embodiments. In some embodiments, at least one of memories 254, 255 stores a subset of the modules and data structures identified herein. In other embodiments, at least one of memories 254, 255 stores additional modules and data structures not described herein.

In an embodiment, display controller 256 may communicate with processor (s) 252 to cause information to be presented on a connected display device 259. In an embodiment, I/O controller 257 may communicate with processor(s) 252 to transfer information and commands to/from a user interface 260, which may include a mouse, a keyboard or key pad, a touch pad, click wheel, lights, a speaker, a microphone, etc. In an embodiment, at least portions of display device 559 and of user interface 560 are combined in a single, integral device, e.g., a touch screen. Additionally, data or information may be transferred to and from computing device 250 via a network interface 270. In some embodiments, computing device 250 may include more than one network interface 270, such as a wireless interface and a wired interface.

The illustrated computing device 250 is only one example of a computing device suitable to be particularly configured for use in one of on-board systems 100, 160, 170, 180, 190. Other embodiments of computing device 250 may also, or instead, be used in one of on-board systems 100, 160, 170, 180, 190, even if the other embodiments have more, fewer and/or different components than those shown in FIG. 7, have one or more combined components, or have a different configuration or arrangement of the components. Moreover, the various components shown in FIG. 7 can be implemented in hardware, a processor executing software instructions, or a combination of both hardware and a processor executing software instructions, including one or more signal processing and/or application-specific integrated circuits.

Of course, the applications and benefits of the systems, methods and techniques described herein are not limited to only the above examples. Many other applications and benefits are possible by using the systems, methods and techniques described herein.

Furthermore, when implemented, any of the methods and techniques described herein or portions thereof may be performed by executing software stored in one or more non-transitory, tangible, computer readable storage media or memories such as magnetic disks, laser disks, optical discs, semiconductor memories, biological memories, other memory devices, or other storage media, in a RAM or ROM of a computer or processor, etc.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

1. A passenger unit for use on-board a passenger vehicle, the passenger unit comprising: a first connector configured to physically couple to a second connector on a mounting unit, the mounting unit being installed on, or proximate to, a particular seat of a plurality of seats on-board the passenger vehicle; a display; a memory storing a passenger unit identifier; a wireless network interface; and a controller configured to (i) obtain a seat location code of the particular seat from the mounting unit, and (ii) cause the seat location code and the passenger unit identifier to be transmitted, via the wireless network interface, to a server on-board the passenger vehicle, the server being configured to map the passenger unit to the particular seat using the seat location code and the passenger unit identifier.

2. The passenger unit of aspect 1, wherein the controller is configured to automatically obtain the seat location code at least by reading the seat location code from a memory of the mounting unit after the passenger unit has been coupled to the mounting unit via the first and second connectors.

3. The passenger unit of aspect 1, further comprising a first near-field communication (NFC) interface, wherein the controller is configured to obtain the seat location code from the mounting unit at least by receiving the seat location code from the mounting unit via the first NFC interface and a second NFC interface of the mounting unit.

4. The passenger unit of aspect 1, further comprising a first radio frequency identification (RFID) interface, wherein the controller is configured to obtain the seat location code from the mounting unit at least by receiving the seat location code from the mounting unit via the first RFID interface and a second RFID interface of the mounting unit.

5. The passenger unit of aspect 1, further comprising an imaging sensor, wherein the controller is configured to obtain the seat location code from the mounting unit at least by causing the imaging sensor to scan a visual representation of the seat location code located on an exterior surface of the mounting device.

6. The passenger unit of aspect 1, wherein the controller is configured to obtain the seat location code from the mounting unit at least by detecting an electrical configuration of the second connector after the passenger unit has been coupled to the mounting unit via the first and second connectors.

7. The passenger unit of any one of aspects 1 through 6, wherein the passenger unit identifier is a medium access control (MAC) address of the passenger unit.

8. A system for identifying seat associations on-board a passenger vehicle having a plurality of seats, the system comprising: a server associated with a first memory; a mounting unit installed on, or proximate to, a particular seat of the plurality of seats; and a passenger unit including (i) a first connector configured to physically couple to a second connector on the mounting unit, (ii) a display, (iii) a second memory storing a passenger unit identifier, (iv) a wireless network interface, and (v) a controller configured to obtain a seat location code from the mounting unit, and cause the seat location code and the passenger unit identifier to be transmitted to the server via the wireless network interface and a wireless access point, wherein the server is configured to (i) receive the transmitted seat location code and passenger unit identifier via the wireless access point, (ii) generate, using the received seat location code and passenger unit identifier, assignment data linking the passenger unit to the particular seat, and (iii) store the assignment data in the first memory.

9. The system of aspect 8, wherein: the mounting unit includes a third memory storing the seat location code; and the controller is configured to obtain the seat location code from the mounting unit at least by reading the seat location code from the third memory after the passenger unit has been coupled to the mounting unit via the first and second connectors.

10. The system of aspect 8, wherein: the mounting unit includes a first near-field communication (NFC) interface; the passenger unit includes a second NFC interface; and the controller is configured to obtain the seat location code from the mounting unit at least by receiving the seat location code from the mounting unit via the first and second NFC interfaces.

11. The system of aspect 8, wherein: the mounting unit includes a first radio frequency identification (RFID) interface; the passenger unit includes a second RFID interface; and the controller is configured to obtain the seat location code from the mounting unit at least by receiving the seat location code from the mounting unit via the first and second RFID interfaces.

12. The system of aspect 8, wherein: the mounting unit includes a visual representation of the seat location code on an exterior surface of the mounting unit; the passenger unit includes an imaging sensor; and the controller is configured to obtain the seat location code from the mounting unit at least by causing the imaging sensor to scan the visual representation of the seat location code.

13. The system of aspect 8, wherein: the second connector is arranged according to a hardwired configuration that is indicative of the seat location code; and the controller is configured to obtain the seat location code from the mounting unit at least by detecting the hardwired configuration of the second connector.

14. The system of any one of aspects 8 through 13, wherein the mounting unit is installed on a back of a seat immediately in front of the particular seat.

15. The system of any one of aspects 8 through 14, wherein the server is on-board the passenger vehicle.

16. The system of any one of aspects 8 through 15, wherein the passenger vehicle is an aircraft.

17. A method, implemented on-board a passenger vehicle having a plurality of seats, for identifying seat associations, the method comprising: obtaining, by a passenger unit, a seat location code from a mounting unit installed on, or proximate to, a particular seat of the plurality of seats, wherein the passenger unit is configured to physically couple to the mounting unit; retrieving, from a memory of the passenger unit, a passenger unit identifier; transmitting, from the passenger unit to an on-board server via a wireless local area network, the seat location code and the passenger unit identifier; receiving, at the on-board server via the wireless local area network, the seat location code and the passenger unit identifier; generating, at the on-board server and using the seat location code and the passenger unit identifier, assignment data linking the passenger unit to the particular seat; and storing the assignment data in a memory associated with the on-board server.

18. The method of aspect 17, wherein obtaining the seat location code from the mounting unit includes reading the seat location code from a memory of the mounting unit after the passenger unit has been physically and electrically coupled to the mounting unit.

19. The method of aspect 17, wherein obtaining the seat location code from the mounting unit includes either: receiving the seat location code from the mounting unit via a near-field communication (NFC) interface of the passenger unit and an NFC interface of the mounting unit; or receiving the seat location code from the mounting unit via a radio frequency identification (RFID) interface of the passenger unit and an RFID interface of the mounting unit.

20. The method of aspect 17, wherein obtaining the seat location code from the mounting unit includes either: scanning, via an imaging sensor of the passenger unit, a visual representation of the seat location code on an exterior surface of the mounting unit; or detecting a hardwired configuration of a connector of the mounting unit.

Thus, many modifications and variations may be made in the techniques, methods, and structures described and illustrated herein without departing from the spirit and scope of the present claims. Accordingly, it should be understood that the methods and apparatus described herein are illustrative only and are not limiting upon the scope of the claims.

What is claimed is:

1. A passenger unit for use on-board a passenger vehicle, the passenger unit comprising:
    a first connector configured to physically couple to a second connector on a mounting unit, the mounting unit being installed on, or proximate to, a particular seat of a plurality of seats on-board the passenger vehicle;
    a display;
    a memory storing a passenger unit identifier;
    a wireless network interface; and
    a controller configured to
        obtain a seat location code of the particular seat from the mounting unit, and
        cause the seat location code and the passenger unit identifier to be transmitted, via the wireless network interface, to a server on-board the passenger vehicle, the server being configured to map the passenger unit to the particular seat using the seat location code and the passenger unit identifier,
    wherein the controller is configured to obtain the seat location code from the mounting unit at least by detecting an electrical configuration of the second connector after the passenger unit has been coupled to the mounting unit via the first and second connectors.

2. The passenger unit of claim 1, wherein the passenger unit identifier is a medium access control (MAC) address of the passenger unit.

3. A system for identifying seat associations on-board a passenger vehicle having a plurality of seats, the system comprising:
    a server associated with a first memory;
    a mounting unit installed on, or proximate to, a particular seat of the plurality of seats; and
    a passenger unit including
        a first connector configured to physically couple to a second connector on the mounting unit, wherein the second connector is arranged according to a hardwired configuration that is indicative of the seat location code,
        a display,
        a second memory storing a passenger unit identifier,
        a wireless network interface, and
        a controller configured to
            obtain a seat location code from the mounting unit, and
            cause the seat location code and the passenger unit identifier to be transmitted to the server via the wireless network interface and a wireless access point,
    wherein the controller is configured to obtain the seat location code from the mounting unit at least by detecting the hardwired configuration of the second connector, and
    wherein the server is configured to
        receive the transmitted seat location code and passenger unit identifier via the wireless access point,
        generate, using the received seat location code and passenger unit identifier, assignment data linking the passenger unit to the particular seat, and
        store the assignment data in the first memory.

4. The system of claim 3, wherein:
    the mounting unit includes a third memory storing the seat location code; and
    the controller is configured to obtain the seat location code from the mounting unit at least by reading the seat location code from the third memory after the passenger unit has been coupled to the mounting unit via the first and second connectors.

5. The system of claim 3, wherein the mounting unit is installed on a back of a seat immediately in front of the particular seat.

6. The system of claim 3, wherein the server is on-board the passenger vehicle.

7. The system of claim 3, wherein the passenger vehicle is an aircraft.

8. A method, implemented on-board a passenger vehicle having a plurality of seats, for identifying seat associations, the method comprising:
 obtaining, by a passenger unit, a seat location code from a mounting unit installed on, or proximate to, a particular seat of the plurality of seats, wherein the passenger unit is configured to physically couple to the mounting unit, wherein obtaining the seat location code from the mounting unit includes detecting a hardwired configuration of a connector of the mounting unit;
 retrieving, from a memory of the passenger unit, a passenger unit identifier;
 transmitting, from the passenger unit to an on-board server via a wireless local area network, the seat location code and the passenger unit identifier;
 receiving, at the on-board server via the wireless local area network, the seat location code and the passenger unit identifier;
 generating, at the on-board server and using the seat location code and the passenger unit identifier, assignment data linking the passenger unit to the particular seat; and
 storing the assignment data in a memory associated with the on-board server.

\* \* \* \* \*